United States Patent
Warren et al.

(10) Patent No.: US 7,933,689 B2
(45) Date of Patent: Apr. 26, 2011

(54) METHOD FOR CONTROLLING AT LEAST ONE LOAD CONNECTED TO A PRIMARY AND A BACKUP POWER SUPPLY

(75) Inventors: Donald Warren, Chesterfield, MO (US); John Smith, Irving, TX (US)

(73) Assignee: Lennox Industries Inc., Richardson, TX (US)

( * ) Notice: Subject to any disclaimer, the term of this patent is extended or adjusted under 35 U.S.C. 154(b) by 0 days.

(21) Appl. No.: 12/752,837

(22) Filed: Apr. 1, 2010

(65) Prior Publication Data

US 2010/0191387 A1  Jul. 29, 2010

Related U.S. Application Data

(62) Division of application No. 11/943,721, filed on Nov. 21, 2007, now Pat. No. 7,720,576.

(51) Int. Cl.
*G05D 3/12* (2006.01)
*G05D 5/00* (2006.01)
*G05D 9/00* (2006.01)
*G05D 11/00* (2006.01)
*G05D 17/00* (2006.01)
*G06F 1/00* (2006.01)
*H02J 1/10* (2006.01)
*H02J 3/14* (2006.01)
*H02J 7/00* (2006.01)

(52) U.S. Cl. .......... 700/292; 700/86; 700/297; 700/298; 713/300; 713/310; 713/340; 307/23; 307/29; 307/65

(58) Field of Classification Search .................... 700/82, 700/292, 295, 297–298; 713/300, 310, 340; 307/23, 29, 65
See application file for complete search history.

(56) References Cited

U.S. PATENT DOCUMENTS

| | | | |
|---|---|---|---|
| 4,300,199 A | 11/1981 | Yoknis et al. | |
| 5,311,451 A * | 5/1994 | Barrett | 700/278 |
| 5,623,531 A | 4/1997 | Nilssen | |
| 5,661,463 A | 8/1997 | Letchak et al. | |
| 6,229,681 B1 | 5/2001 | Lee | |
| 6,455,954 B1 | 9/2002 | Dailey | |
| 6,628,012 B2 | 9/2003 | Reuter | |
| 6,680,547 B1 * | 1/2004 | Dailey | 307/31 |
| 7,031,854 B2 | 4/2006 | Lin et al. | |
| 7,206,944 B2 * | 4/2007 | Odaohhara et al. | 713/300 |
| 7,228,429 B2 | 6/2007 | Monroe | |
| 7,259,477 B2 * | 8/2007 | Klikic et al. | 307/65 |
| 7,446,433 B2 * | 11/2008 | Masciarelli et al. | 307/66 |
| 7,521,823 B2 * | 4/2009 | Klikic et al. | 307/66 |
| 7,555,364 B2 | 6/2009 | Poth et al. | |
| 7,626,283 B1 * | 12/2009 | Baucum et al. | 307/23 |
| 2002/0126431 A1 | 9/2002 | Yanagisawa | |
| 2004/0150374 A1 | 8/2004 | Kraus | |
| 2005/0141154 A1 | 6/2005 | Consadori et al. | |
| 2005/0151657 A1 | 7/2005 | Lockhart et al. | |
| 2005/0206530 A1 | 9/2005 | Cumming et al. | |

(Continued)

*Primary Examiner* — Ramesh B Patel

(57) ABSTRACT

A method for controlling at least one load connected to a primary and a backup power supply having sensor for sensing a voltage on the primary power supply with a first voltage sensor; sensor for sensing a voltage on the backup power supply with a second voltage sensor and implementing a control algorithm in a controller to augment power from said primary power supply with power from the backup power supply in response to an input from the first and second voltage sensors and an input from at least one external sensor wherein the algorithm controls a switch between the at least one load and the primary and backup power supplies.

16 Claims, 4 Drawing Sheets

U.S. PATENT DOCUMENTS

| | | |
|---|---|---|
| 2006/0087785 A1 | 4/2006 | Bender et al. |
| 2007/0145826 A1 | 6/2007 | Clark et al. |
| 2007/0145949 A1 | 6/2007 | Matsushima et al. |
| 2007/0220907 A1 | 9/2007 | Ehlers |
| 2007/0278860 A1 | 12/2007 | Krieger et al. |
| 2008/0016366 A1 | 1/2008 | Monroe |
| 2008/0183335 A1 | 7/2008 | Poth et al. |
| 2008/0278115 A1 | 11/2008 | Huggins |

* cited by examiner

METHOD FOR CONTROLLING AT LEAST ONE LOAD CONNECTED TO A PRIMARY AND A BACKUP POWER SUPPLY

CROSS-REFERENCE TO RELATED APPLICATIONS

This Application is a Divisional of U.S. application Ser. No. 11/943,721 filed on Nov. 21, 2007 now U.S. Pat. No. 7,720,576, by Donald Warren et al., entitled "INTELLIGENT AUXILIARY POWER SUPPLY SYSTEM WITH CURRENT AND TEMPERATURE MONITORING CAPABILITIES", which is commonly assigned with the present invention and incorporated herein by reference.

TECHNICAL FIELD OF THE INVENTION

The present invention relates generally to power systems, and in particular to an auxiliary power supply system which is capable of making user defined power management decisions based on information received from a plurality of sensors.

BACKGROUND OF THE INVENTION

Heating and cooling systems typically consume the greatest amount of electrical power in both residences and businesses. In fact, during the summer months in many metropolitan areas, the demand for electricity may exceed an energy provider's capacity to deliver enough electricity to all customers, resulting in brownouts and blackouts. As a result of this phenomenon, energy providers have begun to implement various pricing schemes which feature higher costs for customers who consume power during peak demand periods. Other pricing schemes may involve charging the consumer higher prices based on their peak consumption per billing period. In addition to tiered pricing schemes, some energy providers have also added utility surcharges to the bills of those customers who consume power during peak hours.

The prior art reveals auxiliary power supply systems which attempt to help alleviate some of these problems recently faced by energy consumers. These prior art systems provide a means for supplying auxiliary power to a business or residence during power outages or during times selected by the user to correspond to peak demand hours. Some prior art systems include the use of fuel powered portable generators which are very noisy and can often be dangerous to the user if the exhaust from said generators is not properly ventilated. Another drawback of using fuel powered generators is that the rising cost of fuels such as gasoline and diesel, make the prospect of long term use of such generators unaffordable for many consumers.

Other auxiliary power supply systems revealed in the prior art utilize rechargeable batteries, which provide a quiet, clean power supply source. Such a system is revealed in the U.S. Pat. No. 6,455,954 to Dailey ("the '954 patent") which claims an auxiliary power supply system having a switch which disconnects a load from a line delivering electricity from an energy provider, and connects said load to rechargeable batteries.

The switch disclosed by the '954 patent is activated by a programmable controller which directs the switch to shift the load to the batteries during power outages and during time periods of peak demand. The programmable controller relies on an internal clock to decide whether the current time is "on peak" of "off peak." One drawback of such a system is that the controller may switch to the auxiliary power source (batteries) during inappropriate periods should the controller's clock malfunction in some manner, potentially causing the user to be charged higher energy prices. Further, the system is limited to pricing schemes wherein the utility provider sets rates based solely on time.

Therefore, a need exists for an auxiliary power supply system which is capable of monitoring a plurality of sensing devices and making user defined decisions based on data received from said devices.

SUMMARY OF THE INVENTION

Accordingly, there is provided herein, an auxiliary power supply system that, in its preferred embodiments, is capable of monitoring a plurality of sensing devices and utilizing the information provided by said devices to make appropriate power management decisions when certain conditions, as predetermined by the user, are present. By utilizing an auxiliary source of power when certain conditions are present, such as during periods of peak power use, the user may realize increased energy savings. Furthermore, by utilizing the information received from a plurality of sensing devices, the auxiliary power supply system of the present invention will not switch to the auxiliary power source during inappropriate periods.

In one aspect of the invention, the auxiliary power supply system is coupled to a system configured for heating, ventilating, and air conditioning (HVAC). The auxiliary power supply system includes an intelligent controller which may be configured by the user to receive input from a plurality of sensors. A current monitoring sensor coupled to the line supplying current to the residence or business, transmits to the intelligent controller, information relating to the amount of current being delivered to said residence or business. Similarly, indoor and outdoor temperature sensors transmit temperature information to the intelligent controller. The intelligent controller may be configured by the user to switch the HVAC system from line power to auxiliary power during periods of high power consumption by the user's residence or business, or during times the user's energy provider charges higher prices for power consumption ("peak demand periods"). If the user configures the auxiliary power system to switch the HVAC system over to the auxiliary power source during peak demand periods, the intelligent controller will first determine if certain current and temperature conditions are present. The intelligent controller may be configured by the user to compare information received from the sensors to certain "set" values before switching to the auxiliary power source. The set values may include set current values, set temperature values, and other values pertaining to sensors connected to the auxiliary power supply system. Algorithms specifically related to controlling furnace operation during winter months may also be implemented by the intelligent controller when so configured by the user. The intelligent controller may be configured by the user via a personal computer, a personal digital assistant, or other similar electronic device capable of communicating with said intelligent controller. Information received from the sensors as well as information concerning operation of the HVAC system, is temporarily stored in a memory, such as a database where it may utilized by the intelligent controller in making power management decisions.

In another aspect of the invention, the intelligent controller is configured to communicate with a remote electronic device. The remote electronic device may include a device controlled by the energy provider, such as a computer, configured to transmit a signal capable of being received by the intelligent controller, directing said intelligent controller to switch to auxiliary power. The remote electronic device may also include a user controlled personal computer, personal digital assistant, or other such device capable of communicating with the intelligent controller. Using a remote electronic device, the user may configure the intelligent controller when away.

In still another aspect of the present invention, the auxiliary power supply system further comprises an uninterruptible power supply (UPS) apparatus including the transfer switch, a voltage sensor, a charger, and an inverter. The UPS is connected to the intelligent controller, a main distribution panel, the HVAC system, and the auxiliary power source.

BRIEF DESCRIPTION OF THE DRAWINGS

The novel features believed characteristic of the invention are set forth in the appended claims. The invention itself, however, as well as a preferred mode of use, further objectives and advantages thereof, will be best understood by reference to the following detailed description of illustrative embodiments when read in conjunction with the accompanying drawings, wherein:

DETAILED DESCRIPTION

Several embodiments of Applicants' invention will now be described with reference to the drawings. Unless otherwise noted, like elements will be identified by identical numbers throughout all figures.

Figure 1:
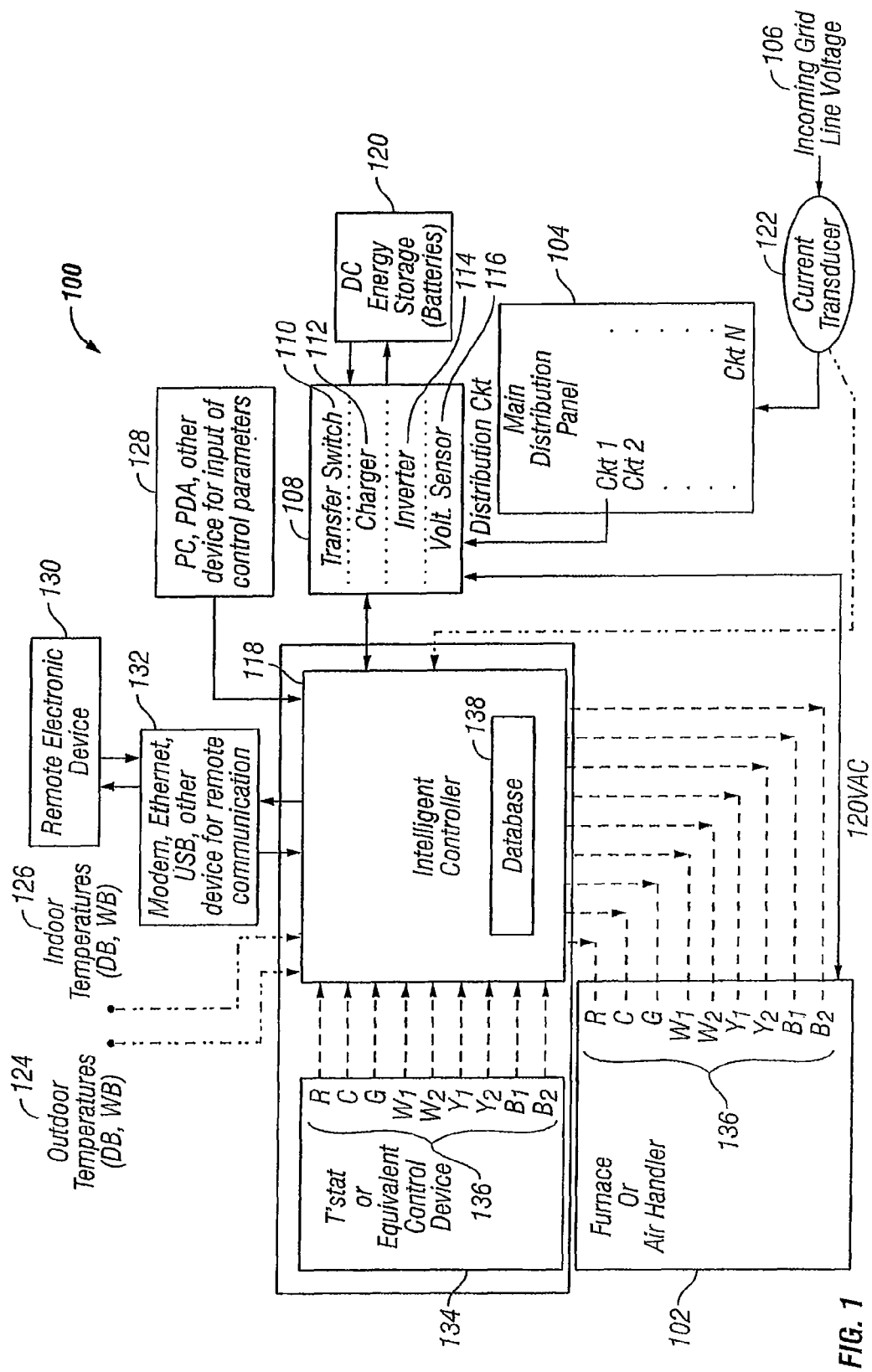
FIG. 1 is a schematic of an auxiliary power supply system according to a preferred embodiment of the present invention.

Referring to FIG. 1, a schematic of a preferred embodiment of the auxiliary power supply system 100 of the present invention is shown. The auxiliary power supply system 100 is configured for installation and use in both residences and businesses. The presently preferred embodiment of the system 100 is configured for use with loads such as heating, ventilating, or air conditioning systems (HVAC), including both furnaces and air handlers 102. However, it should be noted that other loads may be similarly connected should the user so desire. For example, a water heater may be connected to the power supply system in order to supply auxiliary power to said heater during appropriate periods.

The system 100 is coupled to the main distribution panel 104 serving the residence, business, or other control area. The main distribution panel 104 is connected to the energy provider's main utility line 106 which supplies electricity to the residence or business. One advantage of the present invention over some backup power supply systems found in the prior art is that in order to install the system 100 of the present invention, entry into the main distribution panel 104 is not required, which substantially reduces installation costs.

An uninterruptible power supply (UPS) apparatus 108 comprising a transfer switch 110, a charging system 112, a voltage sensor 114, and an inverting system 116 is connected to the main distribution panel 104. The transfer switch 110 of the presently preferred embodiment has two configurations which may be implemented by a programmable intelligent controller 118. In the first configuration, the transfer switch 110 closes a circuit between the main distribution panel 104 and the air handler/furnace 102. In the first configuration, the transfer switch 110 also closes a circuit between the main distribution panel 104 and the charging system 112 and opens a circuit between the inverter 116 and the air handler/furnace 102. The charging system 112 and the inverting system 116 are connected to an auxiliary power source, which comprises an array of DC batteries 120 in the presently preferred embodiment. The batteries 120 are the source of auxiliary power during power outages, periods of peak demand, and other appropriate periods. Thus, in a preferred embodiment, transfer switch 110 is coupled between at least one load 102 and a first 104 and second power source 120. Also in a preferred embodiment, both the first 104 and second 120 power sources comprise a voltage sensor 116 or the like. A voltage sensor can comprise a sensor designed to measure voltage or a switch or the like designed to respond to a high or low voltage. This aids in the determination of whether there is a power outage. In the transfer switch's 110 second configuration, the transfer switch 110 opens the circuit between the main distribution panel 104 and the air handler/furnace 102 and closes the circuit between the inverter 116 and the air handler/furnace 102. The elements of the UPS apparatus 108 are well known in the art. Those skilled in the art should pay particular attention to the specifications and requirements of the air handler/furnace 102, the batteries 120, the incoming voltage/current from the distribution panel 104, and the intelligent controller 118 when choosing specific UPS 108 apparatus components. Further, while not shown, it is possible to have a circuit breaker between the UPS 108 and the air handler/furnace 104.

The intelligent controller 118 directs the transfer switch 110 to operate in a particular configuration based on information received from a plurality of sensors. As used herein sensors is defined as any device which can sense or retrieve information useful in operation such as time, temperature, voltage, current, humidity, pressure, and other information. In order to monitor the power being supplied to the residence or business, a current monitoring sensor such as a current transducer 122 is coupled to any line which the user would like to monitor. It is contemplated that the user would couple the current transducer to the main incoming utility line 106 supplying electricity to a control area, such as a residence or business. The current transducer 122 may be placed at any of a plurality of locations including an external power meter (not shown), or internally at the main distribution panel 104. Power monitoring sensors such as current transducers 122 are well known in the art and those skilled in the art may choose to implement various types of power monitoring devices in alternate embodiments of the invention. The current transducer 122 of the presently preferred embodiment is connected to the intelligent controller 118 by wireless means. The current transducer 122 and intelligent controller 118 both contain hardware well known in the art for such wireless communications. Alternate embodiments of the invention may be configured to utilize a wired means for connecting the current transducer 122 to the intelligent controller 118. The intelligent controller 118 is configured to compare the information received from the current transducer 122 with set current values defined by the user in order to determine which switch configuration is most appropriate. A more detailed description of the power management algorithms employed by the intelligent controller 118 is found below.

Outdoor temperature sensors 124 and indoor temperature 126 sensors are also connected to the intelligent controller 118 by wireless means. Wireless means for transmitting temperature information is well know in the art. It is contemplated that alternate embodiments of the system 100 may include a wired means for connecting the temperature sensors 124/126 to the intelligent controller 118. The outdoor 124 and indoor 126 temperature sensors may utilize thermocouples, thermistors, or other well known temperature sensing devices known in the art. The intelligent controller 118 of the presently preferred embodiment is configured to continuously receive the signals sent by the indoor 126 and outdoor 124 temperature sensors as well as the current transducer 122. However, alternate embodiments of the intelligent controller 118 may be configured to receive information from the sensors at predetermined or random intervals of time. The user will configure the intelligent controller 118 to include set temperature values. Logic decisions made by the intelligent controller 118 will take into account whether the outdoor and indoor temperature are greater or lesser than the user defined set temperature values. A more detailed description of the power management algorithms employed by the intelligent controller 118 is found below. Alternate embodiments of the present invention may include more than one of each of the indoor 126 and outdoor 126 temperature sensors, allowing for more extensive temperature monitoring of the residence or business.

The intelligent controller 118 will also be configured to receive input from an input device such as an electronic device 128. Examples of such a device include a personal computer, a personal digital assistant, or other electronic device capable of transmitting by wireless or wired means, information entered by the user. The electronic device 128 contains software configured to effectively communicate with the intelligent controller 118. The electronic device 128 will allow the user to enter control parameters such as set temperature values, set current values, and set time periods for use of auxiliary power. The user may also define which control algorithms are to be implemented by the intelligent controller 118.

The intelligent controller 118 also includes a means for sending and receiving communications to and from a remote electronic device 130. The auxiliary power supply system 100 of the presently preferred embodiment is configured to receive signals, via a modem 132 attached to the intelligent controller 118 by means of an Ethernet cable. Telephone lines connecting the modem 132 to a remote electronic device 130 controlled by the energy provider, allows the energy provider to communicate with the system 100. This configuration permits the energy provider to send requests to the intelligent controller 118 to switch to operation under auxiliary power. If the energy provider is capable of providing such signals, said signals will be sent during periods of peak demand and may assist the user in realizing increased energy savings. This capability may prevent the user from being charged increased prices and may also allow said user to benefit from possible incentives offered by the energy provider. The intelligent controller 118 may also send signals to the remote device, providing information related to the status of the auxiliary power supply system 100. For example, if the batteries 120 are not adequately charged, the intelligent controller 118 will send a signal to the energy provider, notifying them that the system 100 is not ready to switch to auxiliary power. It should be noted that alternate embodiments of the invention may include other means for communicating with a remote device. For example, such other means may include communication via universal serial bus (USB), power transmission lines, fiber optics, wireless, or any other transmission means. It is also contemplated that other alternate embodiments of the auxiliary power supply system 100 may include a remote electronic device 130 such as a personal computer or personal digital assistant such that the user may remotely control the operation of the system 100. An advantage of this capability is that it provides the user with increased accessibility and control. For example, before leaving on vacation, the user may turn off their HVAC system or set their thermostat to an efficient temperature setting. Shortly before retuning, the user may wish to activate said HVAC system, via their PDA, such that said HVAC system heats or cools the residence to a normal temperature prior to their arrival.

A thermostat control device 134 is connected to the intelligent controller 118 using standard pin connections 136 well known in the art. The thermostat control device 134 is a means for controlling the furnace/air handlers 102 of HVAC systems. Said thermostat control device 134 permits the user to set a desired temperature value for the control area (residence or business) which is then achieved by means of a feedback control system. The device 134 sends signals to the intelligent controller 118 which directs the operation of the air handler/furnace 102. The intelligent controller 118 is also connected to the air handler/furnace 102 by means of said standard pin connections 136.

The air handler/furnace 102 is connected to the transfer switch 110 by a line which provides an alternating current (AC) voltage. This AC voltage is supplied by either the batteries 128 (via inverter 116) or by the incoming line voltage 106 from the energy provider (via main distribution panel 104), depending on the configuration of the transfer switch 110. The standard pin connections 136 found on both the thermostat control device and the furnace or air handler are as follows: 1.) R (low voltage~24 VAC); 2.) C (common); 3.) G (fan only); 4.) $W_1$ (stage 1 heat); 5.) $W_2$ (stage 2 heat); 6.) $Y_1$ (stage 1 cool); 7.) $Y_2$ (stage 2 cool); 8.) $B_1$ (heat pump stage 1); and 9.) $B_2$ (heat pump stage 2). Although the preceding pin connections 136 are utilized in the presently preferred embodiment, it should be understood that alternate embodiments of the invention may utilize various pin configurations 136.

The intelligent controller 118 is a programmable logic device which is well known in the art and is adapted to communicate with the other elements of the auxiliary power supply system 100, including sensors and other electronic devices capable of communicating with said system 100. The intelligent controller 118 contains a processor, memory, software, a clock, and a plurality of inputs and outputs adapted for communicating with the various elements described herein. The intelligent controller 118 of the presently preferred embodiment is mounted within the thermostat control device 134. However, alternate embodiments of the auxiliary power supply system 100 may be configured such that the intelligent controller 118 is mounted within the UPS 108.

The intelligent controller 118 is adapted to employ a plurality of control algorithms, thus permitting the user to customize the control of the system 100 to best adapt to the pricing scheme implemented by the energy provider. The intelligent controller 118 of the presently preferred embodiment of the auxiliary power supply system 100 is configured to allow for three modes of operation, with each of said modes utilizing a different control algorithm. However, alternate embodiments of the system may be configured such that any number of modes may be configured for implementation. It should be noted that in all modes of operation, the intelligent controller will attempt to switch to auxiliary power if there is a loss of line power or the energy provider requests that the switch occur. However, alternate embodiments may also omit such "triggering events" from the control algorithms employed by the intelligent controller 118.

Figure 2:
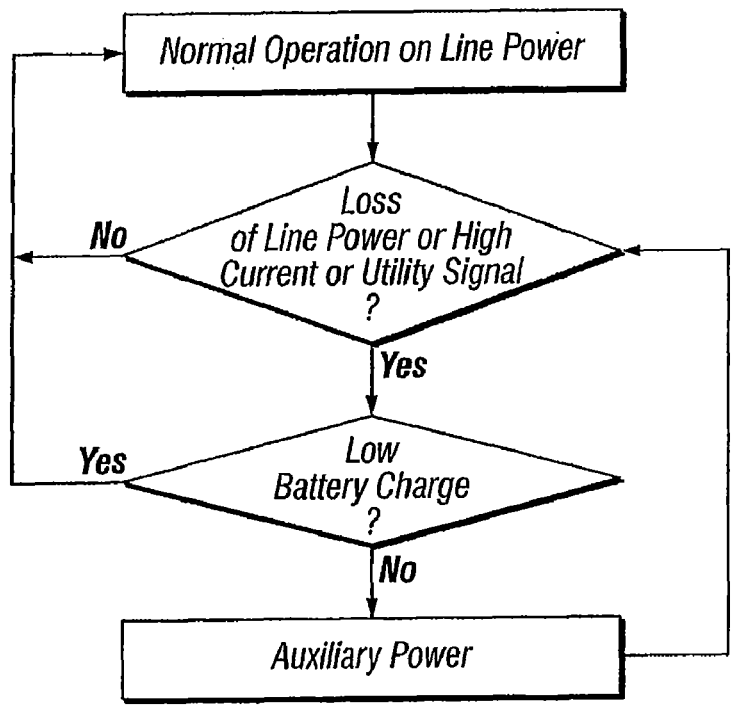
FIG. 2 is a flowchart of the logic employed by the intelligent controller of the present invention to make power management decisions when a peak consumption pricing scheme has been implemented by the user's energy provider.

The first mode of operation may be chosen when the energy provider implements a pricing scheme based on the user's peak power consumption for the billing period. In such a scheme, the user is charged a price for consuming power depending on their peak usage for the billing period. Under this scheme, the control algorithm dictates that the intelligent controller 118 will switch to the auxiliary power source when the current transducer 122 senses current being supplied to the residence or business in excess of a value set by the user. A flowchart of the logic employed by the intelligent controller 118 in the first mode of operation is shown in FIG. 2.

Figure 3:
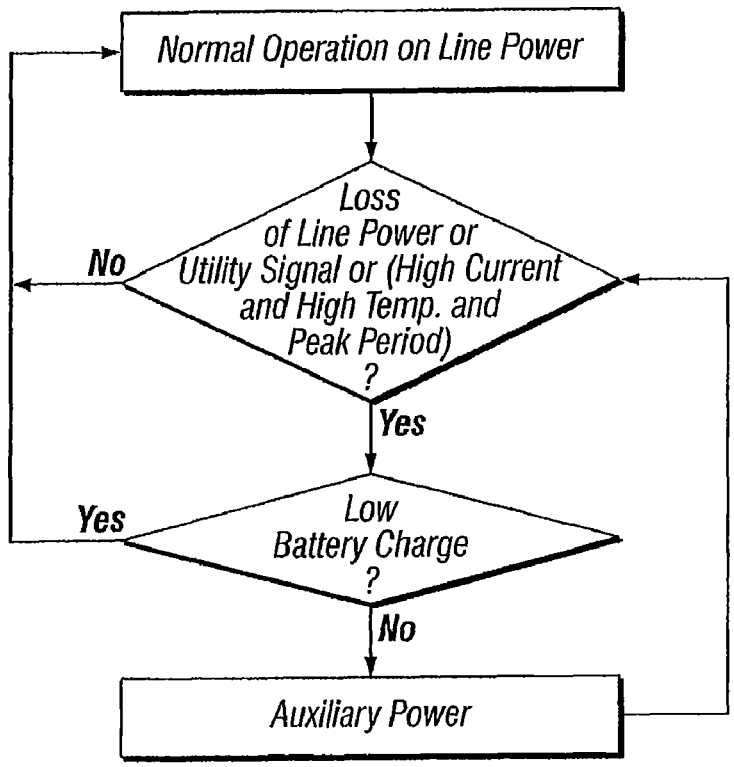
FIG. 3 is a flowchart of the logic employed by the intelligent controller of the present invention to make power management decisions when a time-of-use/peak demand pricing scheme has been implemented by the user's energy provider.

A second mode of operation may be chosen by the user if the energy provider implements a pricing scheme based on the peak demand "seen" by the energy provider. A flowchart of the logic employed by the intelligent controller in the second mode of operation is shown in FIG. 3. In such a pricing scheme, the energy provider may charge higher prices based on time of use. Under this scheme, the user should configure the intelligent controller 118 to switch to the auxiliary power source during the peak time period chosen by the energy provider. In order to ensure that the switch to auxiliary power is made during appropriate periods, the intelligent controller 118 should also be configured to monitor the outdoor temperature and compare it to the set temperature value chosen by the user. The indoor temperature is also monitored, either by an indoor temperature sensor 126 or by a temperature sensor located on the thermostat 134 if so equipped. The intelligent controller 118 uses this data to determine a temperature differential. Because operation of the auxiliary power supply system 100 is to occur during all times of the year, the user may program the intelligent controller 118 to determine when the outdoor temperature value either exceeds or falls below a set temperature value. In such a pricing scheme, the switch to the auxiliary power source will require that the sensed temperature values either exceed or fall below the user determined set temperature values. This provides an advantage not seen in prior art auxiliary power supply systems because the decision by the controller 118 to switch to auxiliary power is not strictly dependent on the accuracy of the controller's 118 clock. In circumstances where the clock does not accurately provide the correct time, the controller 118 will be prevented from switching to auxiliary power if the sensed temperature values are not appropriate. For example, on an early summer morning, if the clock malfunctions such that it indicates a time of 2 pm, the sensed outdoor temperature value is 70° F., and the set temperature value is 90° F., the controller 118 will not switch to the auxiliary power source. When using the second mode of operation, the intelligent controller 118 may also be programmed to compare the measurements taken by the current transducer 122, to predetermined set current values. The user may require that the sensed current value exceed the set current value prior to switching to the auxiliary power supply. By requiring the controller 118 to compare current values, the system 100 is less likely to be activated during inappropriate periods.

Figure 4:
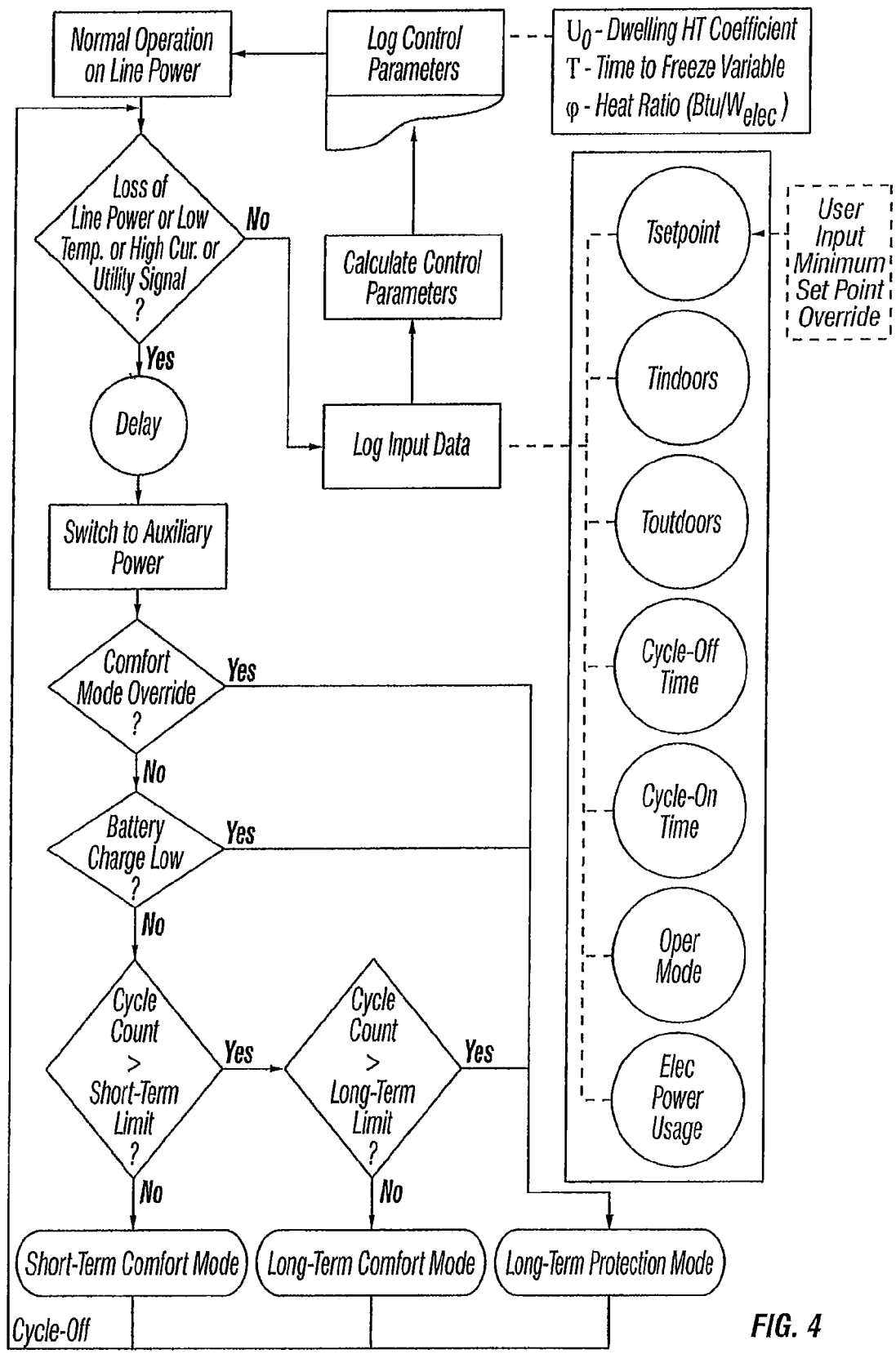
FIG. 4 is a flowchart of the logic employed by the intelligent controller of the present invention to efficiently operate a furnace using power management control algorithms.

In a third mode of operation, the user may choose to program the intelligent controller 118 to control the HVAC system according to a control algorithm configured to more efficiently control the power consumption of a furnace 102. Such a control algorithm is disclosed in the commonly owned U.S. patent application Ser. No. 11/371,751 entitled, "CONTROL ALGORITHM FOR BACKUP POWER SYSTEM" filed on Mar. 9, 2006, which is hereby incorporated by reference. Such a third mode of operation will be especially useful to those utilizing furnaces 102 during winter months. FIG. 4 is a flowchart of the logic employed by the intelligent controller 118 of the present invention to efficiently operate a furnace 102 using power management control algorithms. The control algorithm optimizes battery life based on predetermined dynamics that characterize the association between the furnace 102 and residence or business. The intelligent controller is connected to a database 138 or other means so configured to store information (memory) concerning indoor and outdoor temperature values, heating unit cycle times (length of run time and off time), operating mode (high or low heat), indoor temperature set point, and electrical power usage. With reference to FIG. 4, during normal operation on electrical line power, the intelligent controller 118 continually monitors whether there is a loss of electrical power. If not, the intelligent controller logs input data, calculates control parameters, and logs these parameters. The control parameters comprise the following non-exclusive list: dwelling overall heat transfer coefficient ($U_o$), time to freeze variable (T), and heat ratio ($\phi$). The input data comprise the following non-exclusive list: indoor set point temperature, indoor air temperature, outdoor or exterior air temperature, cycle-off time, cycle-on time, operating mode, and electrical power usage. The preceding data is sent from both the thermostat control device 134, sensors 122, 124, 126. Data pertaining to cycle times and the operating mode is recorded by the intelligent controller 118. These input data are recorded multiple times over time. In one embodiment, such recordings are sufficient to acquire statistically significant calculations.

Still referring to FIG. 4, when line power is lost or any other triggering event occurs, the intelligent controller 118 initiates a delay before switching to auxiliary electrical power. Next, the intelligent controller 118 checks to see whether there is a comfort mode override. If so, the intelligent controller 118 switches into long-term protection mode in which the intelligent controller 118 conserves as much auxiliary electrical energy as possible. If there is no comfort mode override, the intelligent controller 118 checks to see whether the battery 120 has a low charge. If so, the intelligent controller 118 switches into long-term protection mode. If the battery 120 does not have a low charge, the intelligent controller 118 checks to see whether a cycle count is greater than a pre-determined short-term power outage limit. If so, the intelligent controller 118 checks to see whether the cycle count is greater than a pre-determined long-term limit. If this second check is positive, then the intelligent controller 118 switches into long-term protection mode. If the second check is negative, the intelligent controller 118 switches into a long-term comfort mode. The intelligent controller 118 in a long-term comfort mode comprises increasing the differential temperature band as compared to a short-term comfort mode. The intelligent controller 118 may take other actions in a long-term comfort mode to more efficiently use the remaining electrical energy. If the intelligent controller 118 determines that a cycle count is not greater than a pre-determined short-term power outage limit, the intelligent controller 118 continues in a normal or short-term comfort mode. At any time during operation in the auxiliary power configuration, the intelligent controller's 118 indoor temperature set point may be overridden by user input.

Figure 5:
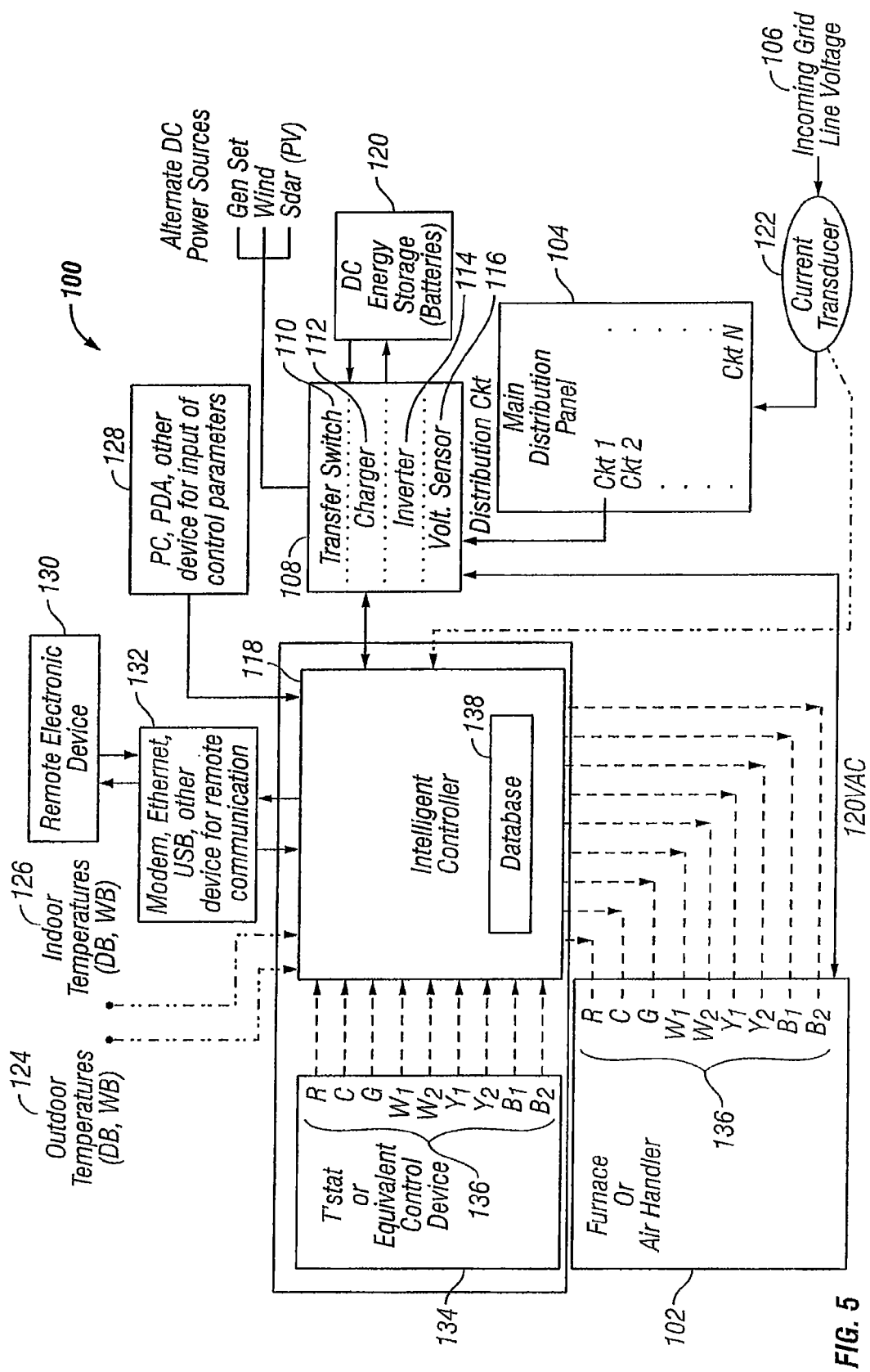
FIG. 5 is a schematic of an alternate embodiment of the auxiliary power supply system of the present invention.

Referring now to FIG. 5, a schematic of an alternate embodiment of the present invention, alternative power sources are connected to the UPS apparatus 108. Said alternative power sources may include electricity provided by such well known technologies as solar paneling 500, wind driven generators 502, portable generators 504, and other sources known in the art. The intelligent controller 118 of alternate embodiments may be programmed to switch to these alternative sources when the batteries 120 can no longer provide the required voltage to operate the HVAC system. The alternative power sources may also be used to recharge the batteries 120, thus saving the user added expenses.

While the invention has been particularly shown and described with reference to a preferred embodiment, it will be understood by those skilled in the art that various changes in form and detail may be made therein without departing from the spirit and scope of the invention.

What is claimed is:

1. A method for controlling at least one load connected to a primary and a backup power supply comprising the steps of:
   a) sensing a voltage on said primary power supply with a first voltage sensor;
   b) sensing a voltage on said backup power supply with a second voltage sensor;
   c) implementing a control algorithm in a controller to augment power from said primary power supply with power from said backup power supply in response to an input from said first and second voltage sensors and an input from at least one external sensor;
   wherein said algorithm controls a switch between said at least one load and said primary and backup power supplies.

2. The method as recited in claim 1 wherein said implementing step of step c) further comprises implementing said control algorithm in response to an input from an input device.

3. The method as recited in claim 2 wherein said at least one input device comprises a programmable thermostat.

4. The method as recited in claim 1 further comprising sensing a current in a main electrical utility line connected to said primary power supply, wherein said implementing step of step c) further comprises implementing said control algorithm in response to an input from said sensing of said current in said main electrical utility line.

5. The method as recited in claim 1 wherein said at least one external sensor comprises a first temperature sensor.

6. The method as recited in claim 5 wherein said first temperature sensor is placed inside a control area and a second temperature sensor is placed outside said control area.

7. The method as recited in claim 1 wherein said at least one external sensor comprises a clock.

8. The method as recited in claim 1 wherein said at least one load comprises a furnace.

9. The method as recited in claim 1 wherein said at least one load comprises an air handler.

10. The method as recited in claim 1 wherein said at least one load comprises a water heater.

11. The method as recited in claim 1 wherein said controller allows for storage of information sent from any of said at least one external sensor and any of said at least one input device in a memory.

12. The method as recited in claim 1 wherein said at least one external sensor communicates wirelessly with said controller.

13. The method as recited in claim 1 wherein said backup power supply includes an inverting system and a charging system.

14. The method as recited in claim 1 wherein a remote electronic device is coupled to said controller, said remote electronic device adapted to transmit information to said controller.

15. The method as recited in claim 14, further comprising sending information comprising a request from said remote electronic device to said controller directing said switch to connect said at least one load to said backup power supply.

16. The method as recited in claim 1 wherein said implementing of step c) further comprises implementing an algorithm for operating a heating unit in either long-term comfort mode, short-term comfort mode, or long term protection mode based on information received from said sensors.

* * * * *